Patented July 3, 1945

2,379,708

UNITED STATES PATENT OFFICE 2,379,708

PRODUCTION OF DIOLEFINS

George W. Hearne, Berkeley, Calif., assignor to Shell Development Company, San Francisco, Calif., a corporation of Delaware No Drawing. Application February 16, 1943, Serial No. 476,129

13 Claims. (Cl. 260—680)

This invention relates to the dehydrohalogenation of vinyl-type halides. It is of particular value in that it provides a practical and economical method for the production of butadiene from 2-chlorobutene-2.

Vinyl-type halides are unsaturated organic halides which are distinguished from non-vinyl-type unsaturated halides in that they contain at least one halogen atom which is attached to an unsaturated carbon atom. Thus, any organic compound embracing any one or more of the structures or groupings,

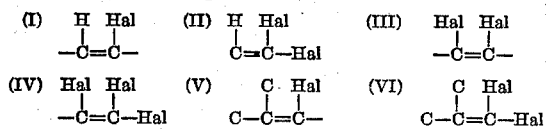

may be properly designated a vinyl-type halide or more simply a vinyl halide, while the term "vinyl halide atom" may be applied to a halogen atom present in such a grouping. The grouping may comprise part of an iso or normal alkyl chain which may or may not be attached to a cyclic radical as of the aromatic, alicyclic, and heterocyclic series or it may comprise part of an alicyclic structure.

Vinyl halide atoms are extremely difficult to remove or react and, as a consequence, the production of vinyl-type halides as by-products in chemical reactions is generally undesirable as creating a disposal problem. However, it is often impossible to avoid the formation of these refractory compounds. Thus, when dichlorbutane is dehydrochlorinated, for example, by means of a basic agent, the desired product being butadiene, substantial quantities of partially dehydrochlorinated material, including 2-chlorobutene-2, may be formed. Because of its refractory character further treatment of the 2-chlorobutene-2 with the basic agent to produce additional quantities of butadiene is without substantial effect.

It is therefore an object of the present invention to provide a method for the conversion of vinyl-type halides to unsaturated organic compounds such as poly-olefins, acetylenes, etc., which are better adapted for use in organic synthesis. Another and more specific object is to provide a process for the production of butadiene-1,3 and compounds isomeric therewith from 2-chlorobutene-2.

The process of the invention whereby the foregoing and other objects are accomplished is based on the discovery that vinyl-type halides may be thermally dehydrohalogenated to unsaturated organic compounds free of vinyl halide atoms. It is executed by subjecting vapors of a vinyl halide to a temperature which is above 400° C., but below the temperature at which substantial molecular degradation of the vinyl halide occurs, and recovering an unsaturated organic compound free of vinyl halide atoms from the reacted mixture produced.

Although any vinyl halide may be subjected to the thermal dehydrohalogenation treatment of the invention, it is preferred to treat vinyl halides wherein the halogen atoms are either chlorine, bromine or iodine.

The reaction may be carried out, for example, in an unpacked reaction tube or chamber, or the tube or chamber may be partially or completely filled with a material capable of catalyzing the reaction and/or a material essentially incapable of true catalytic effect but which acts to promote the desired conversion by providing better heat transfer and a larger surface upon which the reaction may occur. Among the many suitable materials with which the tube or chamber may be partially or completely packed may be mentioned: carbon chips, majolica chips, glass wool, charcoal, pumice, porcelain chips, brass spelter, carborundum, montmorillonite, kieselguhr, silica gel, "activated alumina," etc. Of these materials it has been determined that at least brass spelter and "activated alumina" exert a catalytic effect.

The temperature at which the reaction is carried out may vary with the molecular weight and atomic arrangement of the compound, the space velocity or reaction period, the activity of the particular catalyst if a catalyst is used, the effective concentration of the halide, the operating pressure, etc. In general, the reaction is conducted at a temperature between 400° C. and about 750° C. When the reactor is packed with a material capable of catalyzing the reaction, temperatures of from 400° C. to about 500° C. are usually observed. It has been determined that the desired products are not formed in any significant yield either in the presence or absence of catalytically active agents at temperatures substantially less than 400° C.

If desired, the process may be carried out at high conversion rates, i. e., under such conditions of contact time and temperature as to result in a major portion of the treated halide being converted to reaction products in a single passage through the reactor, or it may be so carried out that only a small portion, as 5 or 10%, of the material treated, is reacted per pass through the reaction zone. In some cases the yield of the most desired product or products is greatest by operating at low conversion rates, while in others it may be advantageous to operate at high conversion. In general, it is preferred to react from about 20 to about 70% of the treated halide per pass through the reactor. The invention as executed in a continuous manner contemplates the recycling of any unreacted material, it being a simple matter in most cases to separate the unconverted halide from the exit gases.

While the use of subatmospheric pressures may facilitate the splitting off of hydrogen halide and therefore allow slightly lower temperatures, the invention is most conveniently executed at or near atmospheric pressure. Any advantage following from the use of subatmospheric pressure can be more conveniently achieved by diluting the vinyl halide with a suitable inert material to reduce its partial pressure within the reaction zone. This procedure may also serve to limit the amount of polymerization and to reduce charring of the packing material. Suitable materials which may be employed to dilute the vinyl halide include hydrogen, nitrogen, carbon dioxide, steam and the like. Of these, steam is most preferred.

In the practice of the invention, should it be desired to recover the hydrogen halide in an anhydrous state, this may be accomplished by scrubbing the reaction mixture with a solvent having a preferential affinity therefor. Examples of solvents having a preferential affinity for hydrogen halides are the aliphatic simple and mixed ethers such as diethyl ether, methyl ethyl ether, di-isopropyl ether, dibutyl ether, dioxane, methyl dioxane, etc. Also, many alcohols, esters, aldehydes, ketones have a selective solvent power for hydrogen halides as contained in admixture with unsaturated organic compounds.

In some instances it may be found convenient to employ a selective solvent for the unsaturated organic products rather than for the hydrogen halide. Higher boiling hydrocarbons or hydrocarbon fractions as kerosene, the normal octanes, the iso-octanes, the octylenes, the nonanes, the nonylenes, the decanes and the like are examples of solvents which may be used to selectively extract unsaturated organic compounds from admixture with hydrogen halides. Following the selective extraction or extractive distillation treatment with the selective solvent or solvents, the dissolved component or components may be recovered from the solvent by any suitable means as by distillation.

The reaction chamber or tube of course should be constructed of material which will not catalyze the molecular degradation of the carbon structure of the halide under treatment. Reactors fabricated from such materials as quartz, brass, bronze, stainless steel, aluminum copper alloys such as "ambraloy," carbon and ceramic materials are, in general, quite satisfactory. If desired, a plurality of reactors may be employed, means being provided whereby the stream of feed material may be shifted from one to another. This procedure is especially advantageous in connection with the removal of carbonaceous deposits.

The process of the invention is especially valuable as a means of converting by-product 2-chlorobutene-2 to butadiene-1,3. In addition to butadiene-1,3 the splitting off of hydrogen chloride from 2-chlorobutene-2 according to the invention yields ethyl acetylene, dimethyl acetylene (butadiene-1,2) and methyl allene. These compounds may find ready application as such or, if desired, they may be re-arranged to butadiene-1,3, for example, by the process disclosed in co-pending application Serial No. 315,076, filed January 22, 1940, now U. S. Patent 2,325,398, issued July 27, 1943. In this latter event the apparatus in which the isomerization or rearrangement is effected may be contiguous with the apparatus in which the dehydrohalogenation is carried out.

Various modes of executing the process of the invention are illustrated by the following examples:

Example I

A quantity of 2-chlorobutene-2 was passed through an unpacked carbon tube having a diameter of about 2 cm. and a length of about 56 cm. The tube was maintained at a temperature of approximately 669° C. by means of an electrically heated metal block within which it was positioned. The mol velocity of the chloride feed was controlled so that not more than about 45% reacted per pass through the tube. Based on the chloride consumed the yield of butadiene-1,3 and butadiene isomers was 48.5%.

Example II

An unpacked quartz tube of approximately the same size was substituted for the carbon tube used in the experiment of Example I. In order to reduce the amount of polymerization the chloride feed was diluted with an equi-molecular quantity of water. The mol velocity of the feed was such that about 60% of the 2-chlorobutene-2 reacted. The yield of butadiene-1,3 and butadiene isomers based on the consumed chloride was about 38%.

Example III

A brass tube, 1.6 cm x 56 cm., packed with brass spelter was next employed. The feed consisted of undiluted 2-chlorobutene-2. During the course of the run the maximum tube temperature was about 480° C. 33% of the chloride feed reacted at the through-put rate observed. The yield of butadiene-1,3 and butadiene isomers (on the chloride consumed) was 54.8%.

Example IV

Using a glass tube packed with "activated alumina" and an undiluted feed a yield of nearly the same magnitude as immediately above was achieved at a somewhat lower reaction temperature which varied between about 422° C. and about 452° C. 51.7 percent of the chloride reacted at this temperature in the presence of the activated alumina at a feed rate of 6 cc. per minute.

I claim as my invention:

1. A process which comprises contacting 2-chlorobutene-2 with "activated alumina" at a temperature of between about 400° C. and about 500° C., and recovering butadiene-1,3 and compounds isomeric therewith from the reaction mixture produced.

2. The process of claim 1 wherein the partial pressure of the 2-chlorobutene-2 within the contact zone is reduced by diluting the 2-chlorobutene-2 with steam.

3. A process which comprises contacting 2-chlorobutene-2 with brass spelter at a temperature of between about 400° C. and about 500° C., and recovering butadiene-1,3 and compounds isomeric therewith from the reaction mixture produced.

4. The process of claim 3 wherein the partial pressure of the 2-chlorobutene-2 within the contact zone is reduced by diluting the 2-chlorobutene-2 with steam.

5. A process for dehydrochlorinating 2-chlorobutene-2 to butadiene-1,3 and compounds isomeric therewith which comprises heating 2-chlorobutene-2 to a temperature of between 400° C. and about 500° C. in the presence of a material capable of catalyzing the dehydrochlorination.

6. A process which comprises heating 2-chlorobutene-2 to a temperature of between 400° C. and about 750° C., and recovering butadiene-1,3 and compounds isomeric therewith from the reaction mixture produced.

7. A process of claim 6 conducted in the presence of a catalytically active material.

8. The process of claim 6 wherein the partial pressure of the 2-chlorobutene-2 within the contact zone is reduced by diluting the 2-chlorobutene-2 with steam.

9. A process for dehydrochlorinating 2-chlorobutene-2 which comprises subjecting 2-chlorobutene-2 to a temperature above 400° C. but below that at which substantial molecular degradation of the 2-chlorobutene-2 occurs.

10. A process which comprises heating a 2-halobutene-2 to a temperature of above about 400° C. but below that at which substantial molecular degradation of the 2-halobutene-2 occurs, and recovering butadiene-1,3 and compounds isomeric therewith from the reaction mixture produced.

11. The process of claim 10 conducted in the presence of a catalytically active material.

12. The process of claim 10 wherein the partial pressure of the 2-halobutene-2 within the contact zone is reduced by diluting the 2-halobutene-2 with steam.

13. A process for dehydrohalogenating a 2-halobutene-2 which comprises subjecting the said 2-halobutene-2 to a temperature of between about 400° C. and about 750° C. in the presence of a material capable of catalyzing the dehydrohalogenation.

GEORGE W. HEARNE.